May 31, 1966

J. WEISMAN 3,253,999

BOILING WATER NUCLEAR REACTOR WITH IMPROVED
VAPOR SEPARATING ARRANGEMENT

Filed Aug. 18, 1961

May 31, 1966 J. WEISMAN 3,253,999
BOILING WATER NUCLEAR REACTOR WITH IMPROVED
VAPOR SEPARATING ARRANGEMENT
Filed Aug. 18, 1961 6 Sheets-Sheet 4

United States Patent Office 3,253,999
Patented May 31, 1966

3,253,999
BOILING WATER NUCLEAR REACTOR WITH IMPROVED VAPOR SEPARATING ARRANGEMENT
Joel Weisman, Pittsburgh, Pa., assignor to Westinghouse Electric Corporation, East Pittsburgh, Pa., a corporation of Pennsylvania
Filed Aug. 18, 1961, Ser. No. 132,403
18 Claims. (Cl. 176—55)

The present invention relates generally to a new vapor separating arrangement and is more particularly directed to the arrangement of the vapor separating equipment within the pressure vessel of a boiling type reactor.

Boiling neutronic reactors are provided with a core region wherein a fissile material, such as $U^{235}$, $U^{233}$ or $Pu^{239}$, is disposed by providing a plurality of discrete fuel elements containing one or more of such isotopes. Moderator material is disposed adjacent the fuel elements to permit the "thermalizing" of neutrons emitted from the fissile material. In addition, a liquid coolant is caused to pass adjacent each of the fuel elements to remove heat therefrom. The nuclear reaction is controlled by providing neutron absorber material such as hafnium, which can be formed desirably as elongated control elements or rods and are inserted and withdrawn from the core region to control the number of neutrons available to propagate the nuclear reaction.

A boiling neutronic reactor produces a vapor-liquid mixture, which must be separated. The separated vapor, however, will also have some entrained liquid within it. As is known, this entrained liquid must also be removed from the vapor for certain external, vapor utilizing means such as turbines. Therefore, it is necessary to use vapor separating equipment to separate the vapor-liquid mixture and in addition to remove the entrained liquid in order to produce a dry vapor.

In a forced circulation boiling neutronic reactor, the vapor velocities are generally so high that simple surface separation of the vapor-liquid mixture is impossible. Most designs of the prior art, therefore, accomplish this vapor separation in large, external, vapor drums. Elimination of these vapor drums is desirable, since it eliminates the cost of the drums and their associated piping. In addition, the elimination of vapor drums reduces the fluid volume of the reactor system and, therefore, reduces the cost of the vapor container (or vapor suppression system) required to contain the vapors released in case of a maximum creditable accident wherein all of the pressurized fluid escapes from the primary system.

In another known design the vapor separating equipment has been located in the reactor vessel head with the objectionable requirement that the head must be enlarged to accommodate the separating equipment. In still another design proposed heretofore the vapor separating equipment has been located on the inner periphery of the reactor vessel, which was considerably enlarged to accommodate the added equipment. This is highly objectionable because the reactor vessels ordinarily required for large size neutronic reactors are nearly at the limit imposed by fabrication and transportation without the additional volume thereof which would be required by the peripheral vapor separating equipment.

In view of the foregoing, it is in general an object of this invention to provide in a boiling neutronic reactor a vapor separating arrangement which is disposed within the reactor pressure vessel in a novel manner.

Another object of this invention is to provide a vapor separating arrangement within the space normally furnished or existing among components of a vapor generator; and more particularly it is an object of this invention to provide a vapor separating arrangement inside a boiling neutronic reactor within the space normally required for the control rods and their associated components, whereby an increase in reactor pressure vessel dimensions is not required.

Another object of this invention is to provide a vapor separating arrangement which can be installed in existing neutronic reactors with no changes or with comparatively minor changes in the reactor pressure vessel and in the internal structure of the reactor.

Another object of this invention is to provide a novel vapor separating arrangement including a plurality of vapor-liquid separators which communicate with a vapor-liquid source.

Still another object of this invention is to make each vapor-liquid separator sufficiently efficient so that the smallest vapor bubble expected will be separated from the vapor-liquid mixture passing through the vapor-liquid separator.

Another object of this invention is to provide means within each vapor-liquid separator which will give a helical motion to the vapor-liquid mixture passing through the vapor-liquid separator so as to create a centrifugal force and to form a vortex whereby the vapor bubbles proceed to the vortex while the liquid is retained at the periphery of the vapor-liquid separator.

Another object of this invention is to provide a plenum chamber communicating with a plurality of vapor-liquid separators with the reactor core, which allows mixing and pressure equalization and consequently a more even distribution of the vapor-liquid mixture to each of the vapor-liquid separators, which thereby allows a single vapor-liquid separator to receive the vapor-liquid mixture from a plurality of core fuel assemblies and which avoids the possibility of hydraulic instability among the various channels of the core caused by two phase flow through the core.

Another object of this invention is to provide vapor separating equipment which is arranged in a novel manner to permit facile replacement of the entire core and the ready replacement or rearrangement of individual fuel assemblies.

Still another object of this invention is to provide a flow path for the dry output vapor and other reactor fluid through the reactor vessel so as to reduce the amount of time and labor required to remove and replace the reactor vessel head.

Briefly, the present invention accomplishes the above cited objects by providing a vapor separating arrangement for a vapor generator disposed within the upper portion of the vapor generator having as its main purpose the separation of vapor from the vapor-liquid mixture passing through the vapor separating arrangement. In one arrangement of the invention, the vapor separating arrangement comprises a plenum chamber above the core of boiling neutronic reactor and a plurality of vapor-liquid separators communicating with the top of the plenum chamber and located above the plenum chamber in a substantially upright position. The plenum chamber allows mixing of the vapor-liquid mixture and thus reduces the duty of those vapor-liquid separators located above the fuel assemblies operating at the highest power level. In one application of the invention, one centrally located vapor-liquid separator can be used for each group of four fuel assemblies in the reactor core without interference with the control rod guide tubes. In this example, each vapor-liquid separator has two stages of vapor separation. The first vapor separating stage performs gross separation of the liquid from the vapor-liquid mixture, and the second vapor separating stage removes mainly entrained liquid from the vapor-liquid mixture.

The vapor is withdrawn through a central opening at the top of the first vapor separating stange and then flows to the second vapor separating stage located directly above the first vapor separating stage. Simultaneously, the liquid exits from the first vapor separating stage through a plurality of peripheral openings located in the upper portion of the first vapor separating stage. The liquid flows downwardly through a plurality of down-comers into the liquid collection chamber located directly above the plenum chamber.

As vapor leaving the first vapor separating stage still contains some entrained liquid, the vapor is passed through the second vapor separating stage, where the entrained liquid is removed from the vapor by a scrubbing device such as a conically-shaped set of tightly spaced vanes. The separated vapor and the separated liquid leaving the second vapor separating stage of the vapor-liquid separator is then collected in the upper and lower portions respectively of a vapor-liquid collection chamber located directly above the liquid collection chamber.

As the vapor-liquid collection chamber is sealed from the liquid collection chamber, at least one overflow pipe is used to couple the vapor-liquid collection chamber to the liquid collection chamber. Each overflow conduit extends vertically downwardly from a point a short distance above the bottom of the vapor-liquid collection chamber to a point below the liquid level maintained within the liquid collection chamber. This overflow arrangement is used to provide a water seal between the vapor-liquid collection chamber and the liquid collection chamber, because the pressure in the vapor-liquid collection chamber is usually lower than the pressure in the liquid collection chamber. If a liquid seal were not maintained between the two chambers, there would be interference with the flow of separated liquid from the second vapor separating stage which is at a lower pressure than the pressure in the liquid collection chamber. The liquid in the liquid collection chamber is also separated from the higher pressure primary liquid entering the reactor vessel in order to prevent interference with the flow of separated liquid from the first vapor separating stage. The liquid in the liquid collection chamber then flows through at least one outlet nozzle in the reactor pressure vessel and then through a conduit to the primary coolant pump, which provides the required pressure differential to maintain the flow of primary liquid through the reactor core.

An additional vapor separating means located at the outer periphery of the vapor-liquid collection chamber can be included to remove any remaining entrained liquid from the vapor collected within the vapor-liquid collection chamber. A system of conduits and headers are used to conduct the dry vapor from inside the reactor pressure vessel to an external vapor utilizing means. The vapor separating arrangement, as hereinbefore described, desirably is disposed within the upper portion of the reactor pressure vessel and is so constructed and arranged so as to permit the removal and replacement of the reactor core, the removal and replacement of individual fuel assemblies, or the re-arrangement of fuel assemblies with the minimum removal of reactor components, with a minimum amount of labor, and with a minimum amount of reactor shutdown time.

In another modification of this invention one vapor-liquid separator is used for each fuel assembly contained within the reactor core and is located directly above each fuel assembly in a substantially upright position. The construction and operation of the vapor separating arrangement for this modification is substantially the same as previously described in the first example with the following exceptions. In this modification, the plenum chamber has been eliminated; and the space previously enclosed by the plenum chamber has been incorporated into the liquid collection chamber. To show the versatility of the invention, in this modification one vapor-liquid separator is used for each fuel assembly; whereas, in the first example only one vapor-liquid separator was used for every four fuel assemblies. In this modification, each vapor-liquid separator is contained within the liquid collection chamber and does not extend into the vapor-liquid collection chamber as previously described in the first example. In the previous example the vapor leaving the second vapor separation stage of the vapor-liquid separator entered directly into the vapor-liquid collection chamber; whereas, in this modification the vapor exits from the second vapor separating stage into the upper portion of the liquid collection chamber and then flows through a plurality of openings, formed in the top of the liquid collection chamber, into the vapor-liquid collection chamber. Another difference between this modification and the former example is the fact that in this modification all separated liquid is collected in the liquid collection chamber; whereas, in the first example the separated liquid from the second vapor separating stage and from the additional vapor separating means, located within the vapor liquid collection chamber, was collected in the vapor-liquid collection chamber. In this modification the separated liquid from the additional vapor separating means is returned to the liquid collection chamber through the plurality of openings located at the top of the liquid collection chamber; whereas, in the previous example the separated liquid collected in the vapor-liquid collection chamber was returned to the liquid collection chamber by means of at least one overflow pipe. However, the basic operation of the vapor-liquid separators and the additional vapor separating means for this modification are substantially the same as previously described for the former example.

Other objects and a more complete understanding of this invention may be had by referring to the following description of an illustrative embodiment of this invention when taken in conjunction with the accompanying drawings in which.

Figure 1:
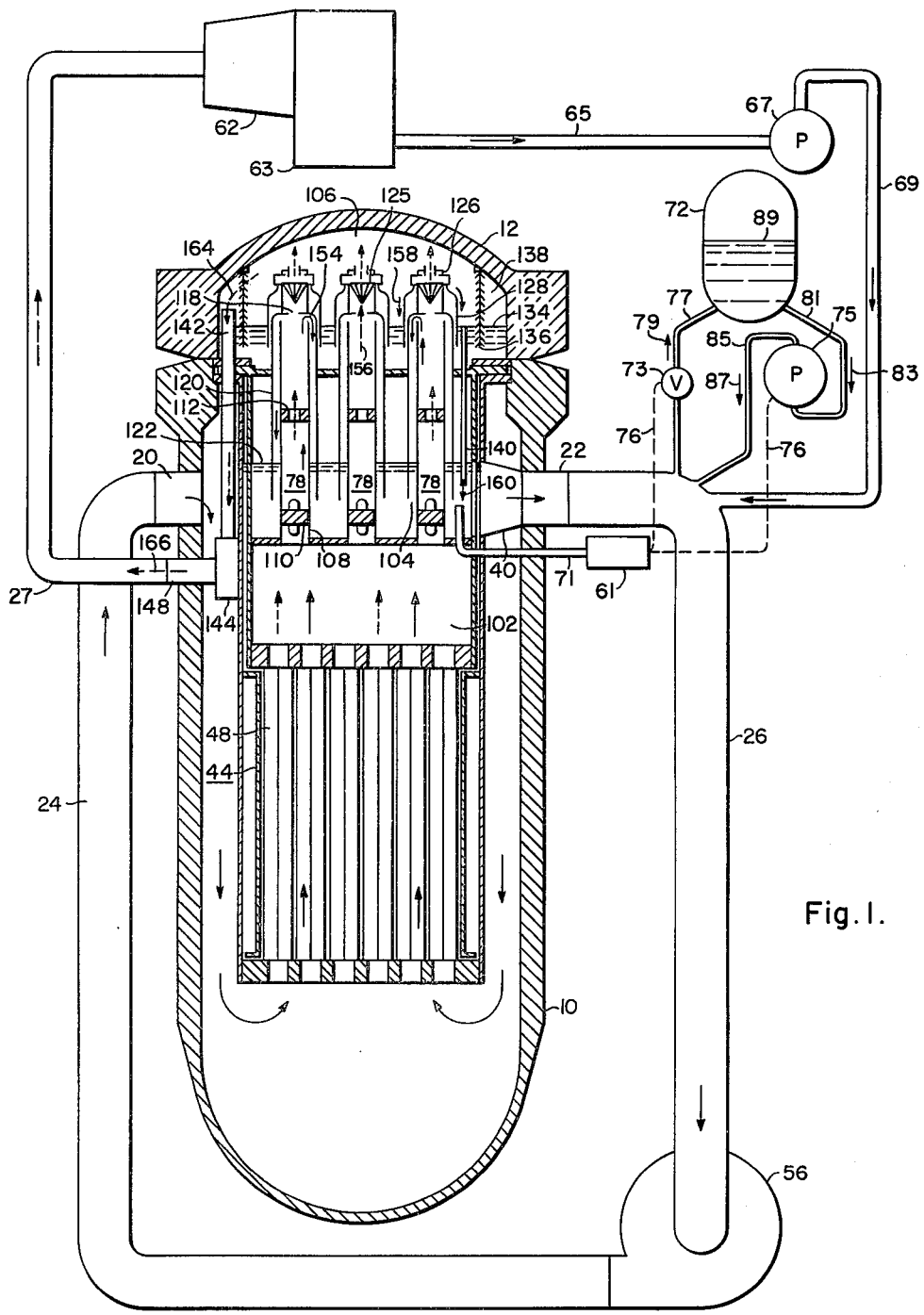
FIGURE 1 is a schematic flow circuit of a boiling neutronic reactor system and for clarity includes a vertical sectional view of the reactor incorporating this invention.
Figure 2A:
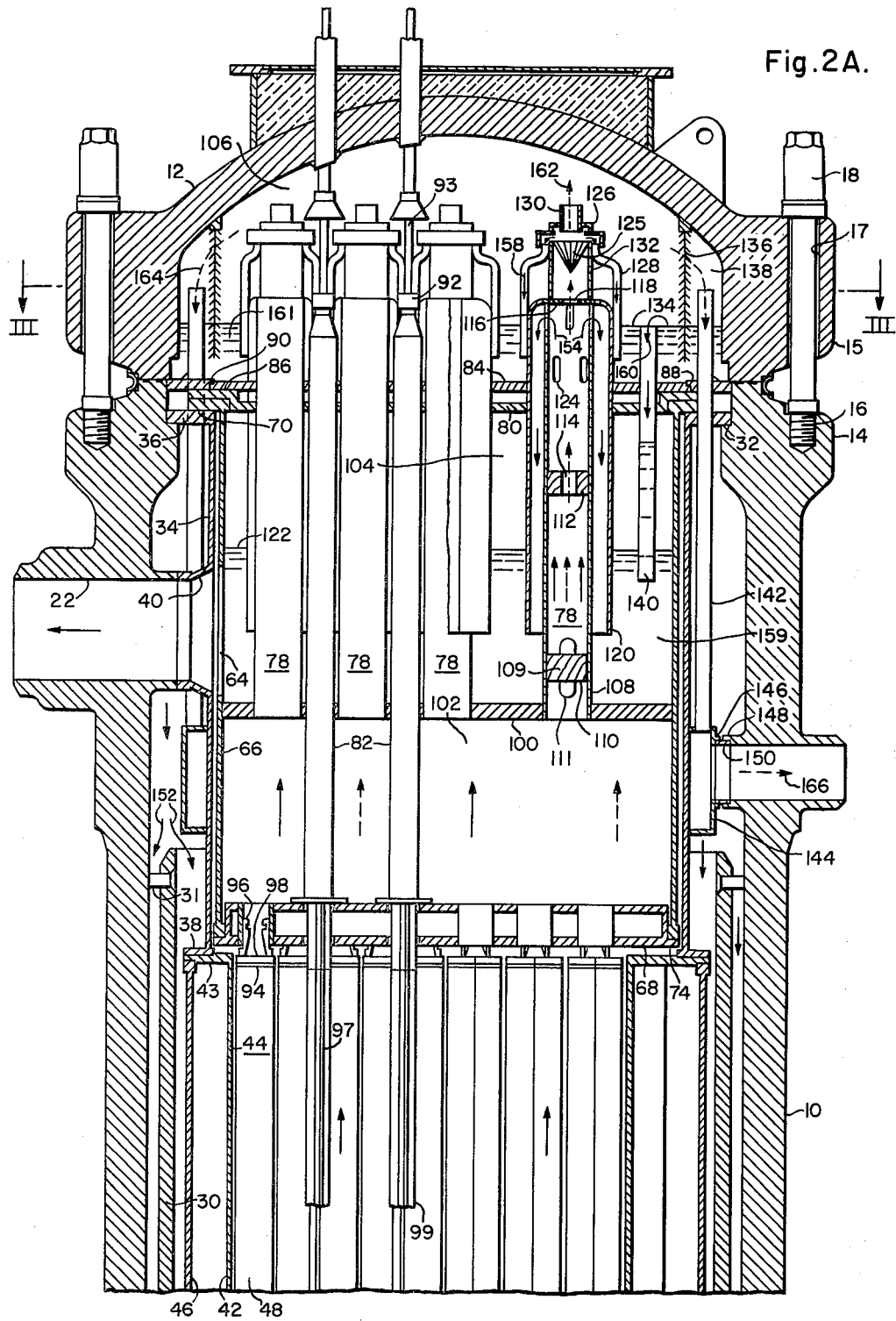
FIG. 2A is an enlarged vertical sectional view of the upper portion of the reactor shown in FIG. 1 and taken along the line II—II of FIG. 3.
Figure 2B:
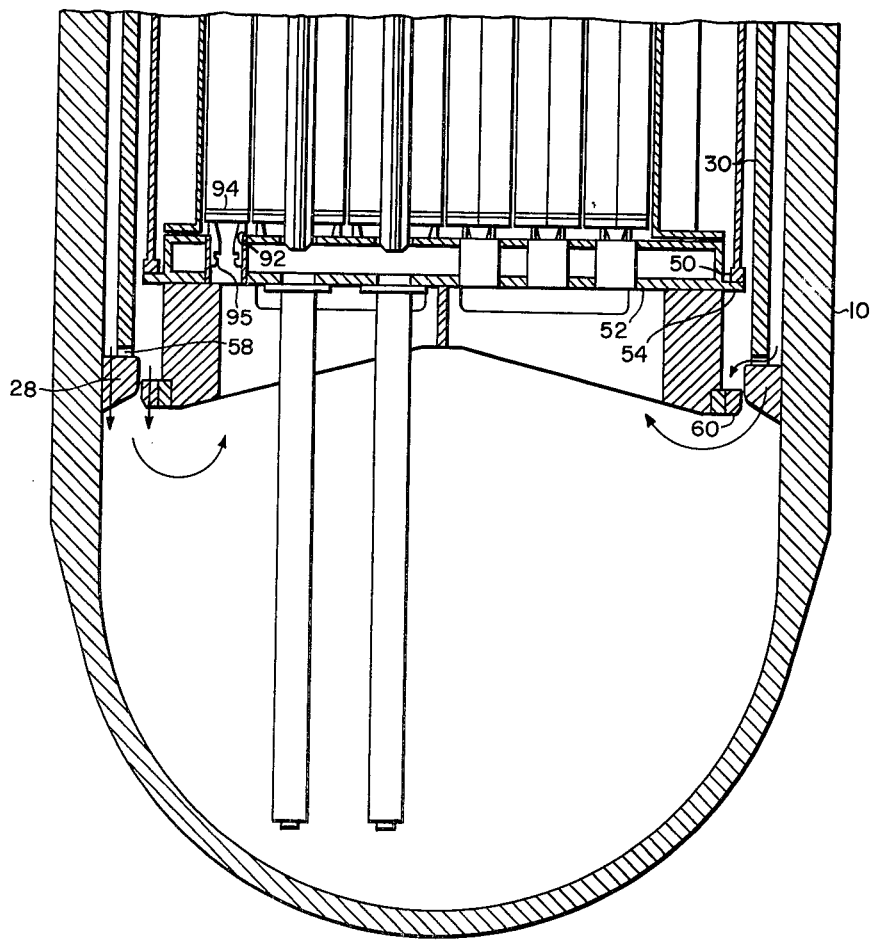
FIG. 2B is an enlarged vertical sectional view of the lower portion of the reactor shown in FIG. 1 and taken along the line II—II of FIG. 3.

Referring now more particularly to FIGS. 1 through 4 of the drawings and FIG. 2 in particular, there is illustrated a pressure vessel comprising a reactor vessel 10 and a reactor vessel head 12. The reactor vessel 10 is formed from a suitable material such as carbon steel, which may be provided with a stainless steel interior lining, and has a wall thickness sufficient to withstand internal pressures on the order of 1500 p.s.i. The vessel 10 is generally cup-shaped having an open top which is adapted to be enclosed by the reactor vessel head or cover member 12. Adjacent the open ends of the vessel 10 and the head 12 there are provided an outwardly extending vessel flange 14 and a head flange 15 respectively, having a plurality of threaded openings 16 and plain openings 17 respectively formed therein which are adapted to receive head bolts 18 for securing the reactor vessel head 12 to the reactor vessel 10. The reactor vessel 10 is provided with inlet and outlet nozzles 20 and 22, respectively, which extend to the interior of the reactor vessel 10 and to which can be secured liquid conduits 24 and 26 for respectively transmitting coolant into and out of the vessel 10.

The interior side wall of the vessel 10 is provided with an inwardly extending, annular thermal shield support flange 28, which can be secured to the reactor vessel 10 by any suitable means such as by welding. A tubular thermal shield 30 is sized to be closely received within the reactor vessel 10 but spaced from the interior side wall thereof. The lower end of the thermal shield 30 is supported by the upwardly facing surface of the support flange 28 and is maintained in spaced relation with the wall of the vessel 10 by means of a plurality of spacing pins 31 which are secured to the thermal shield 30 by any suitable means such as by machine screws. The support flange 28 is preferably provided with axially extending openings (not shown) formed therein and communicating with the space between the thermal shield 30 and the reactor vessel 10 to permit cooling of the thermal shield 30 and the adjacent portion of the reactor vessel 10.

An inwardly facing shoulder 32 is formed on the inner side wall of the vessel 10 adjacent the open end thereof and is adapted to receive the core supporting structure so that a reactor core 44 is suspended therefrom. In furtherance of this purpose, a generally tubular core supporting barrel 34 is provided with an outwardly extending flange 36 on the upper edge thereof which is received and supported by the shoulder 32. The core supporting barrel 34 extends downwardly from its upper flange 36 past the reactor vessel outlet nozzle 22 and terminates in an outwardly extending lower flange 38 at a point below the top of the thermal shield 30. The outlet nozzle 22 is coupled to the core supporting barrel 34 through a core supporting barrel nozzle 40.

An annular core baffle 42 is disposed adjacent the undersurface of the lower flange 38 and has a central opening therein formed of the same configuration as the outer perimeter of the reactor core 44 to receive fuel assemblies 48. The core baffle 42 also is provided with an outwardly extending flange 43 on the periphery of the upper end thereof, in which flange 43 there are provided openings (not shown) for securing the core baffle 42 to the lower end of the core support barrel 34 by suitable means such as by bolts (not shown).

A core barrel 46 is supported by the core supporting barrel 34 and extends downwardly from the core baffle flange 43 and is juxtaposed to substantially all of the thermal shield 30. The core baffle 42 and the core barrel 46 are secured to the lower flange 38 by suitable means such as by bolts (not shown). The lower end of the core barrel 46 is provided with a thickened portion 50 having threaded openings therein (not shown) to which a lower core supporting plate 52 is secured. The lower core plate 52 is provided with an outwardly extending flange 54 on the periphery thereof, in which flange 54 there are provided openings (not shown) for securing the lower core plate 52 to the core barrel 46 by suitable means such as by bolts (not shown) which pass through the openings in the flange 54 and are threaded into the openings in the thickened portion 50 of the core barrel 46.

An upper core plate supporting barrel 66, which has a circular outlet fluid opening 64 directly in line with the nozzle 40 on the core supporting barrel 34, engages an upper core supporting plate 68 and is suspended from the upper flange 36 on the core supporting barrel 34. In furtherance of this purpose, the upper end of the upper core plate supporting barrel 66 is provided with an outwardly extending flange 70, which overlies the inner portion of the upper flange 36 on the core supporting barrel 34. The lower end of the upper core plate supporting barrel 66 is provided with threaded openings therein (not shown), so that an outwardly extending flange 74 provided on the upper core supporting plate 68 is secured to the core barrel 66 by suitable means such as bolts (not shown), which pass through openings (not shown) in the flange 74 and are threaded into the openings in the lower end of the upper core plate supporting barrel 66.

A vapor-liquid separator guide plate 80 is formed to locate and support a plurality of vapor-liquid separators 78 and a plurality of control rod guide tubes 82 to be described hereinafter. The separator guide plate 80 has an outwardly extending offset flange 86, which is disposed to overlie the upwardly facing surface of the flange 70 on the upper core plate supporting barrel 66. The flanges 86 and 70 can then be joined by any suitable means such as an outer peripheral weld or countersunk machine screws. A circular hold down plate 84 is formed of a size to overlie a portion of the flange 86, with each of the plates 80 and 84 having aligned openings extending therethrough for locating and supporting the control rod guide tubes 82 and the vapor-liquid separators 78. The vapor-liquid separator guide plate 80, the upper core plate supporting barrel 66, and the core supporting barrel 34 are held down by an annular core hold down ring 88, which has a shoulder 90 formed at its inner periphery to mate with a corresponding shoulder formed at the outer periphery of the hold down plate 84. The hold ring 88 is, in turn, held down by the reactor vessel head 12.

The reactor core structure described thus far, except for the vapor-liquid separators 78 and the separator guide plate 80, does not form a part of the instant invention and for similar physical and nuclear parameters of a suitable reactor core, reference may be had to the detailed description of the patent application of Robert J. Creagan, Serial No. 686,778, filed September 27, 1957 (refiled as continuation-in-part on September 29, 1960 under Serial No. 59,268), entitled "Neutronic Reactor" and assigned to the Westinghouse Electric Corporation. Generally, the reactor core 44 illustrated in FIG. 2 comprises a plurality of fuel assemblies 48 with each fuel assembly comprising a plurality of tubular fuel elements (not shown) which are formed by suitable means well known in the art; for example, by use of elongated tubular member formed from stainless steel and containing stacked uranium dioxide pellets therein. Certain of the fuel elements can include uranium dioxide in its normal state, that is, with the ratio of $U^{235}$ to $U^{238}$ equal to 1 to 139. Other fuel elements can contain uranium dioxide in a slightly enriched state wherein the ratio of $U^{235}$ to $U^{238}$ is greater than 1 to 139. Obviously, all of the fuel element assemblies can be uniformly enriched to a correspondingly lower percentage such as 3½% and the zones of differing enrichments, described in the aforementioned application, can be eliminated.

Each of the aforementioned fuel elements desirably is hermetically sealed, for example by welding each of the stainless steel tubes at the ends thereof to suitable end plugs. The fuel elements are desirably assembled into the fuel assemblies 48 with the respective ends of the individual fuel elements being secured to the end plates 94. Each fuel assembly 48 is provided with a plurality of lifting lugs 96 disposed at each end therof. The lifting lugs 96 are provided with a plate 98 formed of a size to coextend with the end plate 94 of the fuel assembly 48. The plates 98 are secured to the individual end plates 94 by suitable means such as by tap screws (not shown). Openings (not shown) are provided in each of the plates 98 and the corresponding end plates 94 to permit coolant to flow therethrough.

It will be appreciated that in this embodiment of the invention, the lifting lugs 96 for each of the fuel assemblies 48 in the same at the upper and lower ends of the fuel assemblies 48. The upper and lower lifting lugs 96 for each fuel assembly 48 are received by the upper and lower core supporting plates 68 and 52, respectively; and the fuel assembly 48 is supported by the lower plate 52 through the shoulder 95 on each lifting lug 96. As pointed out in the copending application, control rod channels are formed between certain of the fuel assemblies 48 to permit control rods 97 to be inserted and withdrawn from the reactor core 44. The particular structural arrangement which provides the control rods channels is specifically shown and described in the aforementioned copending application of Creagan. In the present embodiment of the invention, the reactor core 44 is adapted to receive the thirty-two control rods 97, which in this example are formed in a substantially cruciform cross-section and which are adapted to be closely received in the control rod channels. Each control rod 97 is formed from a neutron absorbing material, for example hafnium. The control rods 97 are provided with extensions of similar shape secured to the lower ends thereof. The extensions 99 are preferably formed from a fissile material which is enclosed by a structural metal having a low neutron-absorption cross-section, such as stainless steel.

Referring now to the specific structure of the invention, a discoidal plenum chamber plate 100, with openings formed therein to receive the vapor-liquid separators 78 and the control rod guide tubes 82, is secured to the upper core plate supporting barrel 66 by any suitable means, such as by welding, and located within the upper core plate supporting barrel 66 at a position below the outlet fluid opening 64. The plenum chamber plate 100 thus forms an enclosed plenum chamber 102 within the lower portion of the upper core plate supporting barrel 66 between the plenum chamber plate 100 and the upper core supporting plate 68. The plenum chamber plate 100 also forms a liquid collection chamber 104 within the upper portion of the upper core plate supporting barrel 66 between the plenum chamber plate 100 and the vapor-liquid separator guide plate 80. A vapor-liquid collection chamber 106 is also formed immediately above the liquid collection chamber 104 and within the space enclosed by the reactor vessel head 12.

Figure 3:
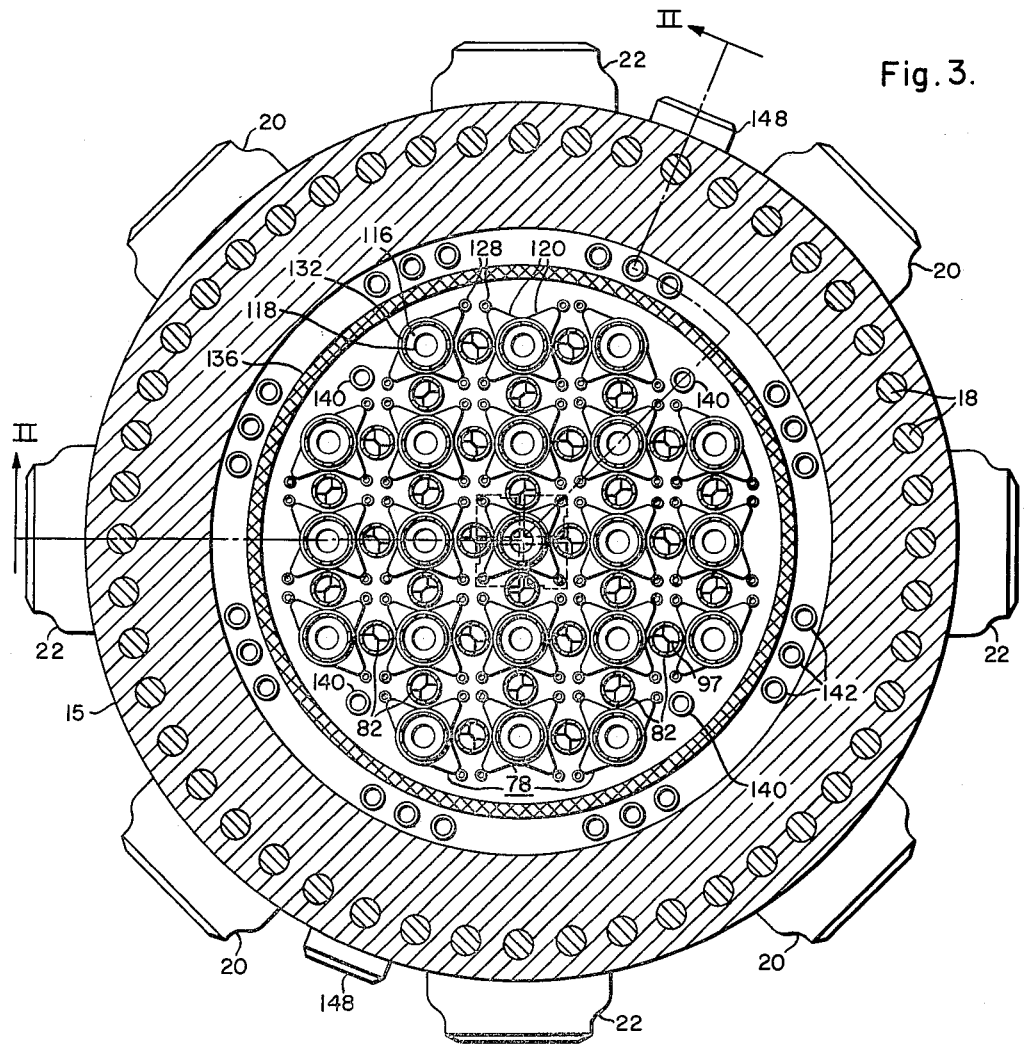
FIG. 3 is a cross sectional view of the reactor generally taken along the line III—III of FIG. 2A to show more clearly the spatial relation between the separators and the reactor control rods and associated structure.
Figure 4:
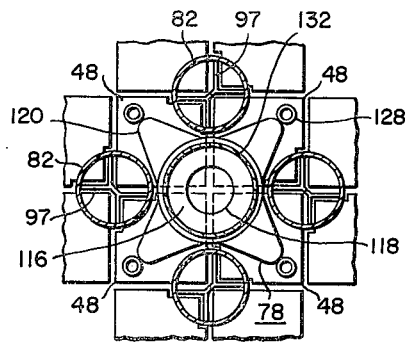
FIG. 4 is an enlarged fragmentary view of a portion of FIG. 3 to illustrate more clearly the relative position of a single vapor-liquid separator in relation to the reactor control rods and fuel assemblies within the immediate area of the separator.

The vapor-liquid separators 78 are disposed among the control rod guide tubes 82 as shown in FIG. 3. In this example of the invention, one separator 78 is used for every four fuel assemblies 48, although it will be apparent as this description proceeds that a different ratio of separators to fuel elements can be employed as dictated by design conditions. As shown in FIG. 4, each vapor-liquid separator 78 is centrally located with respect to the four fuel assemblies 48. The vapor-liquid separators 78 are located in a vertical position and pass through the openings formed in the plenum chamber plate 100, the vapor-liquid separator guide plate 80, and the hold down plate 84. The openings in the plenum chamber plate 100 and the vapor-liquid separator guide plate 80, through which the vapor-liquid separators 78 pass, are sealed by a suitable means such as by welding the adjacent outer surfaces of the separators 78 to the edges of these openings in the plates 80 and 100.

The control guide tubes 82, which are uniformly dispersed among the vapor-liquid separators 78, extend from the upper core supporting plate 68, through the plenum chamber 102, through the liquid collection chamber 104, and into the vapor-liquid collection chamber 106. The openings in the plenum chamber plate 100 and the vapor-liquid separator guide plate 80, through which the guide tubes 82 pass, are sealed in the same manner as the vapor-liquid separators 78. At the top of each guide tube 82 a seal 92, such as packing, is provided between the guide tube 82 and control rod drive shaft 93, which passes through the top of the control rod guide tube 82. The seal 92 prevents excessive pressurization in the vapor-liquid collection chamber 106 as a result of bypassing the primary liquid from the top of the reactor core 44 to the vapor-liquid collection chamber 106 through the control rod guide tubes 82.

In this arrangement, each vapor separator 78 includes two vapor separating stages. The first vapor separating stage comprises, for example, a conduit such as a pipe 108, a first vapor-liquid swirler 110, a second vapor-liquid swirler 112, a first stage end plate 116 and a plurality of first stage downcomer conduits 120. The second vapor separating stage comprises a conically-shaped, vane type separator 125, a second stage vapor enclosure 126, a plurality of second stage downcomer conduits 128, and a second stage vapor outlet 130.

The pipe 108, forming part of the first vapor separating stage, communicates with the plenum chamber 102 and extends upwardly from the plenum chamber plate 100, through the liquid collection chamber 104, and into the vapor-liquid collection chamber 106. The first vapor-liquid swirler 110 is secured within the pipe 108 at the entrance of the separator 78. The swirler 110 has stationary radial vanes 109 twisted around a solid central hub 111.

The second vapor-liquid swirler 112 is secured within the pipe 108 approximately half way between the ends of the pipe 108. The second swirler 112 is similar in design to the first swirler 110, except that a central opening 114 is provided as a vapor passage. The discoidal end plate 116 having a first stage vapor opening 118 in the center is sealably secured to the top end of the pipe 108. To the end plate 116 are attached by any suitable means, such as by welding, the first stage downcomer conduits 120, which are disposed among the control rod guide tubes 82. The first stage downcomer conduits 120 form a triangularly shaped, sealed passage from the end plate 116 downwardly to a point below a liquid level 122 maintained within the liquid collection chamber 104. This provides a liquid seal which prevents the escape of vapor from the first vapor separating stage and also prevents pressure equalization between the liquid collection chamber 104 and the vapor-liquid collection chamber 106. In the uppermost portion of the pipe 108, a plurality of first stage elongated openings 124 are provided which communicate with the first stage downcomer conduits 120.

In the second vapor separating stage of the vapor-liquid separator 78 the vane type separator 125 is located directly above the first stage end plate 118 and includes a conical array of chevrons. The vane type separator 125 and the auxiliary components of the second vapor separating stage are supported by an upper separator conduit 132, which also couples the first vapor separating stage to the second vapor separating stage. The second stage vapor enclosure 126 is cylindrically shaped, has a diameter which is greater than the upper separator conduit 132, and is sealably secured to the top of the vane type separator 125. The second stage downcomer conduits 128, which communicate with the enclosure 126 at the bottom periphery of the closure 126, are located outside the upper separator conduit 132 and the first stage downcomer conduits 120, and extend downwardly to a point below a water level 134 maintained within the vapor-liquid collection chamber 106. This provides a liquid seal which prevents the escape of vapor from the second vapor separating stage. The components comprising the second vapor separating stage are all located within the vapor-liquid collection chamber 106 and are all disposed among the control rod guide tubes 82.

Exteriorly of the vapor separators 78 there is desirably provided a third vapor separating stage, for example a chevron separator 136, which is well known in the art and is generally cylindrical in shape. The chevron separator 136 is located at a position adjacent the lateral periphery of the vapor-liquid collection chamber 106 and is supported from the reactor vessel head 12. Extending downwardly to a position below the liquid level 134 contained within the vapor-liquid collection chamber 106, the chevron separator 136 forms a vapor collection space 138 between the periphery of the reactor vessel head 12 and the outer diameter of the chevron separator 136. At least one overflow conduit 140 is disposed to maintain the desired liquid level 134 within the vapor-liquid collection chamber 106. Extending downwardly through openings formed in the hold down plate 84 and the vapor-liquid separator guide plate 80, the overflow conduit 140 is sealably secured to the separator guide plate 80 by any suitable means such as by welding. The overflow conduit 140 extends downwardly to a point below the water level 122 maintained within the liquid collection chamber 104.

A plurality of vertical vapor downcomer conduits 142 extend downwardly from the vapor collection space 138 through holes formed in the hold down ring 88, the flange 86 of the vapor-liquid separator guide plate 80, the flange 70 of the upper core plate supporting barrel 66, and the upper flange 36 of the core supporting barrel 34 to a vapor header 144. The downcomer conduits 142 are disposed in the annular space between the core supporting barrel 34 and the reactor vessel 10 and thus couple the vapor collection space 138 to the vapor header 144. The downcomer conduits 142 are sealably secured to the upper flange 36 of the core supporting barrel 34 by suitable means such as by welding. The vapor header 144 is a rectangularly shaped annular header sealably secured to the core supporting barrel 34 and utilizes the core supporting barrel 34 as its inner wall. The vapor header 144 contains at least one vapor header outlet nozzle 146, which is aligned with its respective reactor vessel vapor outlet nozzle 148. A backing ring 150 is fitted into the recesses provided in the nozzles 146 and 148. The backing ring 150 is then sealably secured to each of the nozzles 146 and 148 by suitable means such as welding.

The components comprising this invention are formed from a suitable structural material such as stainless steel.

The components comprising this invention are also so arranged so as to permit the removal of the entire reactor core 44, or the removal of and replacement or recycling of the individual fuel assemblies 48, by a procedure to be described as follows: The control rods 97 are remotely disconnected from the control rod drive shaft 93 and remain inserted in the reactor core 44 to prevent the core 44 from going critical during the core removal operation. The head bolts 18 are then removed. Then the reactor vessel head 12 and the chevron separator 136 supported from the reactor vessel head 12 are removed. Following this, the hold down ring 88 and the hold down plate 84 are removed. The next item to be removed is the upper core plate supporting barrel 66 with its associated components such as the upper core supporting plate 68, the plenum chamber plate 10, and the vapor-liquid separator guide plate 80, all of which are rigidly joined to the supporting barrel 66 as previously described, together with the overflow conduits 140, the vapor-liquid separators 78, the control rod guide tubes 82 and the control rod drive shafts 93. The top of the reactor core 44 is now exposed so as to permit the removal and replacement of individual fuel assemblies 48 or the relocation of the fuel assemblies 48.

The following additional steps will have to be performed prior to the removal of the entire reactor core 44. The first step is to cut all vapor conduits 27 at a point as close as practical to the outer wall surface of reactor vessel 10 by any suitable means such as an oxy-acetylene torch. The vapor conduits 27 are then moved to one side, so as to permit accessibility to the backing rings 150 through the reactor vessel vapor outlet nozzles 148. The backing rings 150 are then removed by cutting them with any suitable means such as by the aforesaid oxy-acetylene torch. Initially, the reverse procedure was used for welding the back rings in place. The width of the vapor header 144 is designed so that its outer diameter is slightly less than the internal diameter of the reactor vessel flange 14 to permit the removal of the vapor header 144 without any further disassembly of the header 144. The core supporting barrel 34 can now be removed with its interconnected components such as the vapor downcomer conduits 142, the vapor header 144, the core barrel 46 and the reactor core 44.

In operation of the reactor described herein and with reference more specifically to FIG. 1, the heat developed by the chain-reaction within the reactor core 44 is removed by a suitable primary coolant being circulated through the aforementioned core 44. The primary coolant, which is ordinary water in this case, also serves as the moderator material provided for the chain-reaction being sustained within the core 44. In this arrangement, four primary coolant or circulating loops are utilized, with each loop including a primary coolant pump 56 and associated inlet and outlet conduits 24 and 26, respectively. These latter-mentioned conduits desirably are of the same size as the reactor vessel inlet and outlet nozzles 20 and 22. In order to minimize corrosion within the system, the conduits 24 and 26 as well as the other components of the primary coolant system are fabricated from a corrosion resistant material, such as stainless steel, or from carbon steel lined with stainless steel. The primary coolant pump 56 is preferably of the submersible or canned-motor type, such as that described in the copending application of Cametti and Hagg, entitled "Totally Enclosed Canned-Motor Pump," Serial No. 440,628, filed July 1, 1954, now Patent 2,887,061, dated May 19, 1959, and assigned to the present assignee. The inlet and outlet conduits 24 and 26 of the primary coolant loop respectively are coupled to the reactor vessel inlet and outlet nozzles 20 and 22, respectively. The other primary coolant loops (not shown) are similarly connected to other reactor vessel inlet and outlet nozzles, which are disposed adjacent the inlet and outlet nozzles 20 and 22.

The following tabulation of reactor characteristics is presented as a guide to the construction embodying the present invention of integral vapor separation with the obvious intent that the tabulation is merely exemplary of an illustrative application of the invention and not limitative thereof. Obviously, differing characteristics can be selected by the nuclear engineer upon the basis of readily available technology, when constructing a reactor having a differing power rating.

REACTOR DATA SUMMARY

| Description | Units | Quantity |
| --- | --- | --- |
| General: | | |
| Total Reactor Power | MW$_t$ | 342 |
| Fuel Assemblies | No | 120 |
| Vapor-liquid Separators | No | 30 |
| Reactor Vessel: | | |
| Inside Diameter | In | 118 |
| Inside Height | In | 396 |
| Active Core: | | |
| Active Equivalent Diameter | Ft | 7.56 |
| Active Height | Ft | 7.20 |
| Total Uranium Loading | Tonnes U | 24.321 |
| U$^{235}$ Enrichment (Uniformly Loaded) | Percent | 3.5 |
| Performance Data: | | |
| Coolant Outlet Temperature | °F | 562 |
| Coolant Inlet Temperature | °F | 545 |
| Coolant Pressure at Reactor Core Inlet | P.s.i.a. | 1,175 |
| Coolant Flow | Lb./hr | 14,292,000 |

PRIMARY SYSTEM COMPONENTS

| Description | Number |
| --- | --- |
| Primary Coolant Pumps | 4 |
| Surge Tank | 1 |
| Primary Coolant Loops | 4 |
| Reactor Vessel Vapor Outlet Nozzles | 2 |

The overall flow circuitry is shown in FIG. 1 with the flow circuitry within the reactor shown in more detail in FIG. 2. In these figures the vapor or steam flow has been indicated by dotted line arrows, and the liquid or water flow has been indicated by full line arrows. The water is circulated through the reactor by the primary coolant pumps 56, enters the reactor vessel inlet nozzles 20, and is directed downwardly on either side of the thermal shield 30, as indicated by flow arrows 152 (FIG. 2). At the lower end of the thermal shield 30 the water flows through openings (not shown) in the thermal shield support flange 28, through a plurality of openings 58 at the bottom of the thermal shield 30, and also past four equally spaced guide shims 60 into the lower end of the reactor vessel 10. The water then reverses its direction of flow and passes in an upwardly direction through the reactor core 44. As the water flows through the reactor core 44, the water absorbs heat and a portion of the water is converted into steam.

The steam-water mixture continues its upward flow and then enters the plenum chamber 102. The plenum chamber 102 allows mixing and pressure equalization of the entering steam-water mixture. If the plenum chamber 102 is not present, the vapor-liquid separators 78 over the fuel assemblies 48 in the high power region will impose a high exit pressure drop while those in the low power region will impose a lesser one. This will greatly increase the tendency to hydraulic instabilities among the fuel assemblies 48 at operations with high exit steam qualities. The use of the plenum chamber 102 also allows a reduction in the number of vapor-liquid separators 78 required. In this example, one centrally located vapor-liquid separator 78 is used for each group of four fuel assemblies 48 without interfering with the control rod guide tubes 82 (FIG. 4).

The steam-water mixture, after passing through the plenum chamber 102 enters the vapor-liquid separators 78. Upon entering the vapor-liquid separator 78, the steam-water mixture is given a helical or swirling motion by the first vapor-liquid swirler 110, where the steam-water mixture receives its swirling motion as it passes through the helical, radial vanes 109 of the first vapor-liquid swirler 110. The swirling motion can also be imparted to the steam-water mixture by other means such as a volute or circular bowl with a tangential entrance. The helical motion creates a centrifugal force which establishes a vortex, wherein the steam bubbles proceed to the vortex while the water is retained at the periphery of the pipe 108. The vapor-liquid separator 78 is also designed to have a length sufficiently long to separate the smallest steam bubble that can be reasonably expected. The second vapor-liquid swirler 112 is provided within the pipe 108 to ensure that the vortex will not disappear before the first stage elongated openings 124 (FIG. 2) in the pipe 108 is reached. The second vapor-liquid swirler 112 is similar in design to the first vapor-liquid swirler 110 except that a central opening 114 is provided as a steam passage.

When the steam-water mixture reaches the upper portion of the pipe 108, the steam passes through the first stage vapor opening 118 which is a central vortex finder; and the water, retained at the periphery of the pipe 108, flows through the first stage elongated openings 124 (FIG. 2), as indicated by flow arrows 154, into the first stage downcomer conduits 120. The water then flows downwardly within the first stage downcomer conduits 120 and is discharged at a point below the water level 122 within the liquid collection chamber 104. Since the water level 122 is maintained above the outlet opening of the first stage downcomer conduits 120, an effective water seal is created which prevents the escape of steam from the vapor-liquid separators 78. The water then passes from the liquid collection chamber 104, through the outlet fluid opening 64 (FIG. 2), through the core supporting barrel nozzle 40, through the reactor vessel outlet nozzle 22, and into the outlet conduit 26. The water is then recirculated through the reactor by means of the primary coolant pump 56.

Although gross separation of the steam and water has been accomplished in the first vapor separating stage, the steam leaving the first vapor separating stage through the first vapor opening 118 will still contain some entrained water. The steam now enters the second vapor separating stage as indicated by flow arrow 156. The steam with its entrained water now passes through the vane type separator 125, where the steam is again given a swirling motion. The swirling motion again creates a centrifugal force which causes the water entrained in the steam to be thrown to the periphery of the second stage vapor enclosure 126. The water then flows downwardly, as indicated by flow arrow 158, in the second stage downcomer conduits 128. The water is then discharged from the second stage downcomer conduits 128 at a point below the water level 134 maintained within the vapor-liquid collection chamber 106. The water level 134 is also maintained above the outlet end of the second stage downcomer conduits 128 to provide a water seal for the reasons previously stated. Since the water leaving the vane type separator 125 is at a lower pressure than the water discharged from the first vapor separating stage, it is difficult to return the water from the second vapor separating stage directly to a water reservoir 159 (FIG. 2A) contained within the liquid collection chamber 104 and into which the water from the first vapor separating stage is discharged. A seal is therefore provided by the vapor-liquid separator guide plate 80, and a separate water reservoir 161 is maintained within the vapor-liquid collection chamber 106. The water level 134 within the vapor-liquid collection chamber 106 is maintained by an overflow conduit 140 into which the water from the second vapor separating stage discharges, as indicated by the flow arrow 160. A water seal is again created by having the overflow conduit 140 discharge at a point below the water level 122, which is maintained within the liquid collection chamber 104. This is to prevent steam from the vapor-liquid collection chamber 106 from escaping into the liquid collection chamber 104.

The steam from the vane type separator 125 exits through the second stage vapor outlet 130 as indicated by flow arrow 162 (FIG. 2) and enters the vapor-liquid collection chamber 106. The steam then flows outwardly through the chevron separator 136, at which point any remaining entrained liquid is separated from the steam. After passing through the chevron separator 136, the steam enters the vapor collection space 138. The steam then flows downwardly through the vapor downcomer conduits 142, which communicate with the vapor collection space 138 at a point above the water level 134. The flow path from the vapor-liquid collection chamber 106 to the vapor downcomer conduits 142 is indicated by the flow arrow 164. The steam then flows downwardly in the vapor downcomer conduits 142 into the vapor header 144. From the vapor header 144 the steam flows through the reactor vessel vapor outlet nozzle 148 and into the vapor conduit 27, as indicated by flow arrow 166.

The steam then flows through the vapor conduit 27 to an external vapor utilizing means, as for example a turbine generator 62. From the turbine generator 62 the steam flows into a condenser 63 where the steam is condensed into water. The water then is conducted through a conduit 65 to the suction side of a feedwater pump 67. The feedwater pump 67 then pumps the water through its discharge conduit 69 into the outlet conduit 26 of the primary water flow circuit.

The water level 122 maintained within the liquid collection chamber 104 is controlled by means of a level controller 61, which senses the water level 122 by means of a sensing line 71 which extends from the water within the liquid collection chamber 104 to the level controller 61. The water level 122 is adjusted by the withdrawal or addition of water to a surge tank 72. The level controller 61 controls the operation of a surge valve 73 and a makeup water pump 75 by any suitable means well known in the art such as electrical circuitry 76. When the water level 122 rises, the level controller 61 will cause the surge valve 73 to open. The water in the liquid collection chamber 104 will then flow into the outlet conduit 26, through an inlet surge line 77 as indicated by flow arrow 79, through the surge valve 73, and into the surge tank 72. After the water level 122 has been lowered to the normal position, the level controller 61 will cause the surge valve 73 to close. If the water level 122 drops below the normal water level, the level controller 61 will start the makeup pump 75. Water will then flow from the surge tank 72, through a makeup suction conduit 81 as indicated by flow arrow 83, and into the makeup pump 75. The makeup pump 75 then pumps the water through a makeup pump discharge conduit 85 as indicated by flow arrow 87, and into the outlet conduit 26. When the water level 122 reaches its normal position, the level controller 61 will stop the operation of the makeup pump 75.

A water level 89 is normally maintained at the mid-height of the surge tank 72. This can be accomplished by an auxiliary system (not shown) well known in the art which can supply or remove water from the surge tank 72, as the need arises. The pressure within the surge tank 72 is maintained at a lower figure than the operating pressure within the primary coolant system to permit flow from the primary coolant system to the surge tank 72, when the surge valve 73 is opened. The temperature of the water within the surge tank 72 is maintained at a temperature approximately the same as the temperature of the water in the primary coolant system to avoid thermal shock to the reactor system or the components comprising this auxiliary surge and makeup system upon adjustment of the water level 122. The proper temperature of the water within the surge tank 72 can be maintained by any means well known in the art, as for example electric heaters (not shown), which can be installed within the lower portion of the surge tank 72 and below the normal water level 89.

Figure 5:
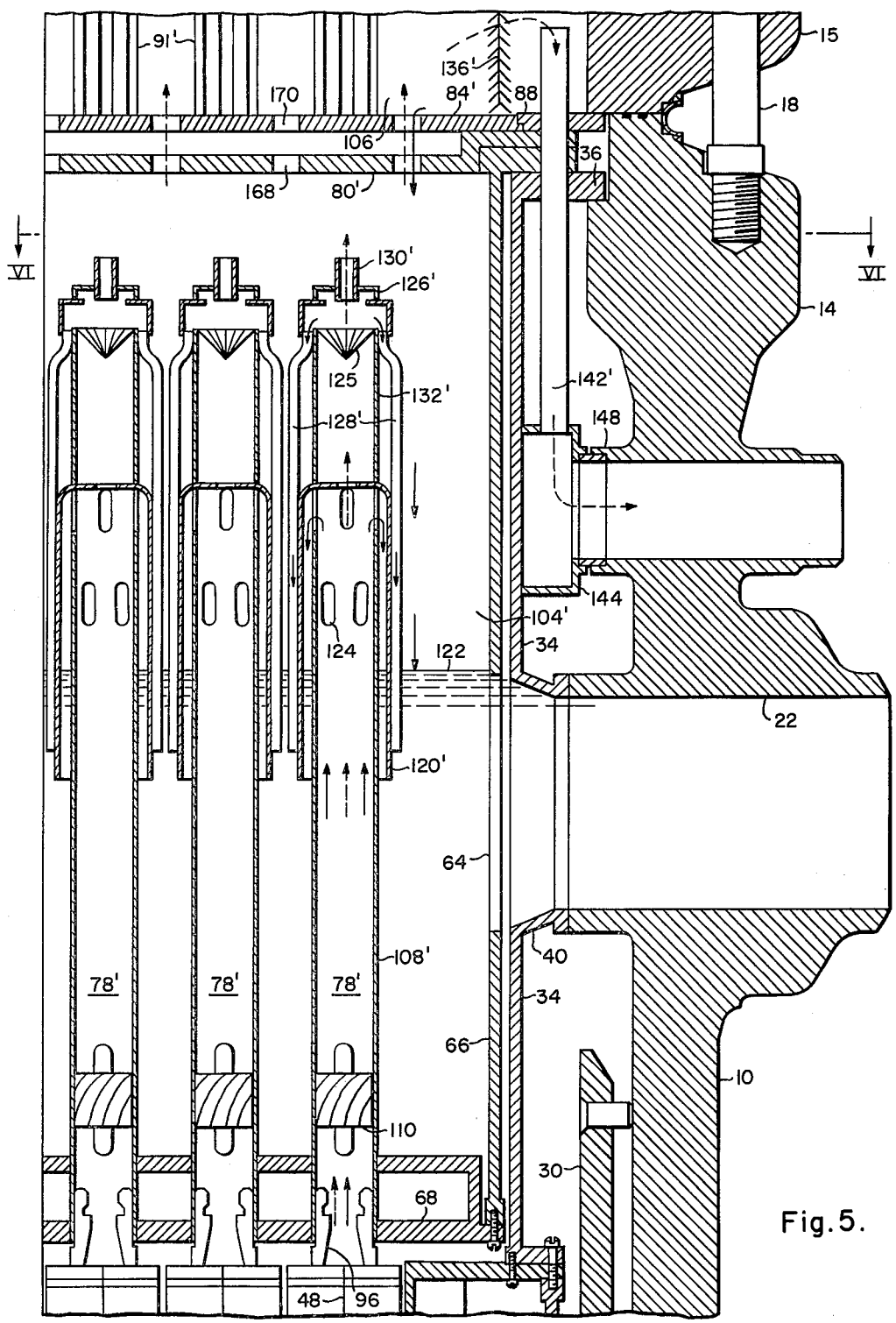
FIG. 5 is an enlarged vertical sectional view of the upper, right-hand portion of a reactor similar to that shown in FIGS. 2A and 2B and illustrating another embodiment of this invention as taken along line V—V of FIG. 6.
Figure 6:
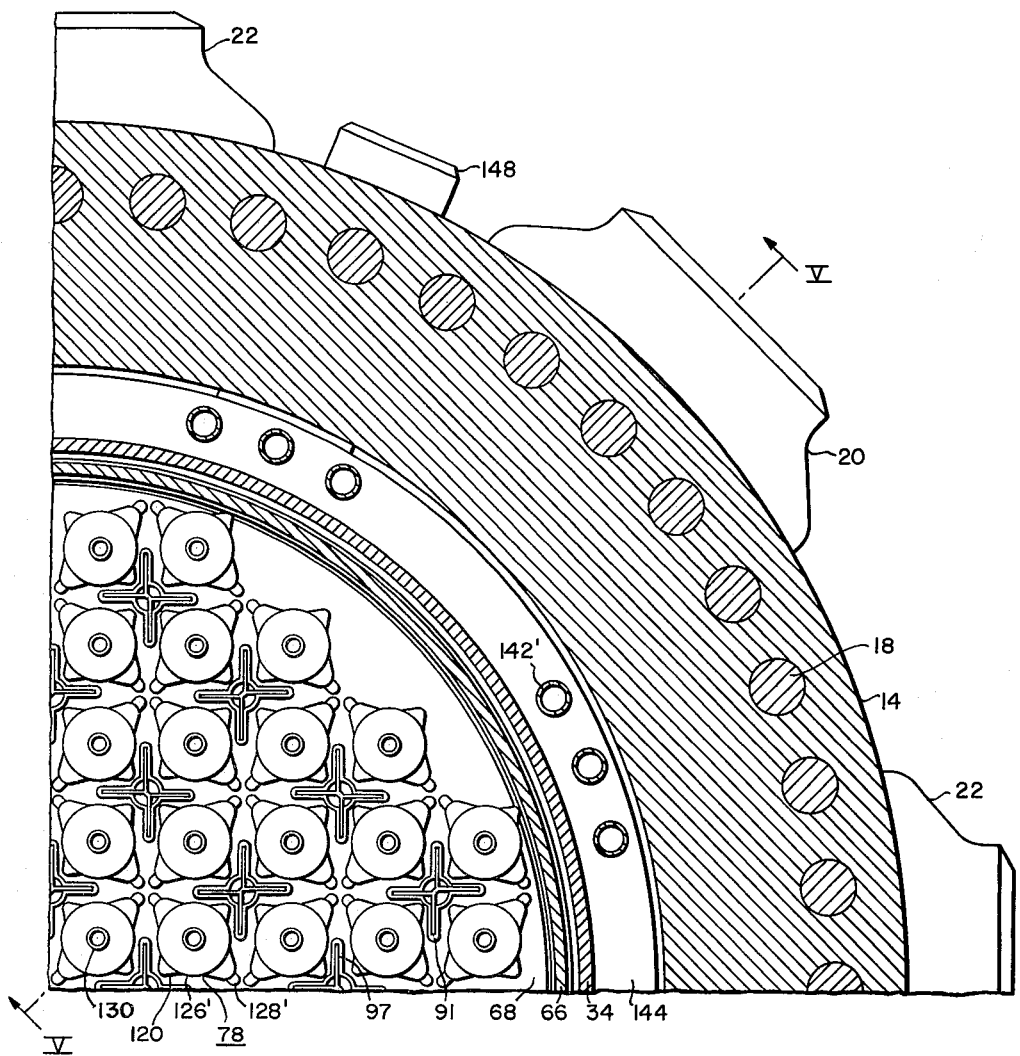
FIG. 6 is a partial, cross sectional view of the reactor shown in FIG. 5 and generally taken along the line VI—VI thereof.

Referring now to FIGS. 5 and 6, an alternate arrangement of the first and second stage vapor separating means will be described. The alternate arrangement of the invention is similar to the embodiment previously described except as noted hereinbelow. The plenum chamber plate 100 (FIG. 2) is omitted together with the plenum chamber 102. Vapor separators 78' are contained within a liquid collection chamber 104', and each vapor-liquid separator 78' is located directly above its respective fuel assembly 48. For this purpose, the separators 78' are of course equal in number to that of the fuel assemblies 48. A pipe 108' of the separator 78' is inserted in the openings within the upper core supporting plate 68. The pipe 108' is sealably secured by any suitable means, such as by welding the adjacent outer surfaces of the pipe 108' to the edges of the openings in the upper core supporting plate 68. The second vapor-liquid swirler 112 (FIG. 2) is eliminated. First stage downcomer conduits 120' can be reduced in size and numbers because of the increased number of vapor separators 78' utilized in this embodiment of the invention as compared to the embodiment explained previously. The number of second stage downcomer conduits 128' have been reduced to two, so as not to interfere with control rod guide tubes 91, because of the increased number of vapor separators 78' utilized in this embodiment of the invention. The second stage downcomer conduits 128' extend from the second stage vapor enclosure 126' downwardly to a point below the water level 122 within the liquid collector chamber 104'. All parts of the vapor-liquid separators 78' are smaller in size as compared to the vapor-liquid separators 78, because of the increased number of the vapor-liquid separators 78'. In order to have the vapor-liquid separators 78' disposed among control rod guide tubes 91, the shape of the control rod guide tube 91 is changed from the cylindrically shaped control rod guide tube 82 to the control rod guide tube 91 having a cruciform shape as shown in FIG. 6.

A plurality of openings 168 and 170 are formed in a vapor-liquid separator guide plate 80' and a hold down plate 84' respectively. No water level 134 (FIG. 2) is maintained within the vapor-liquid collection chamber 106 in this embodiment of the invention. A chevron separator 136' is similar to the chevron separator 136 (FIG. 2) except that the chevron separator 136' extends downwardly to a point in close proximity with the hold down plate 84'.

In this arrangement, the reactor vessel vapor outlet nozzle 148 is located above the reactor vessel outlet nozzle 22. With this type of an arrangement, vapor downcomer conduits 142' are shorter in length as compared to the arrangement shown in FIG. 2, because the vapor header 144 is located above the reactor vessel outlet nozzle 22 instead of below the outlet nozzle 22 as shown in FIG. 2. The vapor downcomer conduits 142' in this arrangement are sealably secured by any suitable means, as by welding to the upper flange 36 of the core supporting barrel 34.

In operation, the flow circuitry for this arrangement is similar to the flow circuitry described for FIGS. 1 and 2 except as noted hereinbelow. Substantially all of the steam-water mixture from the individual fuel assembly 48 flows into the vapor separator 78' disposed directly above its respective fuel assembly 48. In this arrangement, the water entering the second stage downcomer conduits 128' is discharged below the water level 122 maintained within the liquid collection chamber 104'. In addition, this modification requires that the pressure at the liquid level 122 be the same as at the exit of the second stage vapor outlet 130 for proper operation of the vapor separators 78'. This pressure equalization can be accomplished by varying the position of the liquid level 122 in response to the steam flow rate. Also the water removed by the chevron separator 136' returns through the openings 170 and 168 in the hold down plate 84' and the vapor-liquid separator guide plate 80' respectively and then drops into the water contained within the liquid collection chamber 104'. The remainder of the flow circuitry is exactly the same as previously described with reference to FIGS. 1 and 2.

From the foregoing, it is apparent that novel and efficient vapor separating arrangements, particularly adapted for use in boiling reactors have been disclosed therein.

Although the invention has been described with a considerable degree of particularity, it is to be understood that the present disclosure has been made by way of illustrative examples of the invention and that numerous changes in the details of construction and the combination and arrangement of parts may be resorted to without departing from the spirit and the scope of the invention as hereinafter claimed. It is to be understood, moreover, that certain features of the invention can be employed without a corresponding use of other features thereof, and that novel features of the disclosed vapor separating arrangement can be employed in other than reactor applications.

What is claimed as new is:

1. In a boiling neutronic reactor including a container therefor, a reactor core supported within said container, a plurality of control rods vertically insertable into said core from above, and a plurality of fuel assemblies containing fissile material and mounted within said reactor core, the combination comprising a vapor separating arrangement within said container for separating vapor from a vapor-liquid mixture formed in said reactor core, said arrangement being disposed above said reactor core within the space required therein by the control rods when withdrawn and comprising a first stage means for gross separation of vapor and liquid, a second stage means coupled to said first stage means for separating entrained liquid within the vapor separated by said first stage separating means, means for collecting said second stage separated vapor, means for collecting the separated liquid from both said first and second stage separating means, and means for conducting said separated vapor from said container to vapor utilizing means.

2. In a boiling neutronic reactor including a container therefor, a reactor core supported within said container, and a plurality of fuel assemblies containing fissile material and mounted within said reactor core, the combination comprising a vapor separating arrangement within said container for separating vapor from a vapor-liquid mixture formed in said reactor core, said arrangement being disposed above said reactor core and comprising a first stage means for gross separation of vapor and liquid, a second stage means coupled to said first stage means for separating entrained liquid within the vapor separated by said first stage separating means, a third stage means located within the upper portion of said container and juxtaposed to said second stage separating means for separating any remaining entrained fluid within the vapor separated by said second stage separating means, means for collecting the separated liquid from said first, said second, and said third stage separating means, means for collecting said third stage separated vapor, and means for conducting said third stage separated vapor from said container to vapor utilizing means.

3. In a boiling neutronic reactor including a container therefor, a reactor core supported within said container, a plurality of fuel assemblies containing fissile material and mounted within said reactor core, and means for circulating liquid coolant through said reactor core, the combination comprising a vapor separating arrangement within said container disposed above said core for separating vapor from a vapor-liquid mixture formed in said reactor core, means disposed between the vapor separating arrangement and said core for pressure equalization of said mixture, means for collecting said separated vapor and said separated liquid, and means for conducting said separated vapor from said container to an external vapor utilizing means.

4. In a boiling neutronic reactor including a container therefor, a reactor core supported within said container, a plurality of fuel assemblies containing fissile material and mounted within said reactor core, and means for circulating liquid coolant through said reactor core, the combination comprising a vapor separating arrangement within said container disposed above said core for separating vapor from a vapor-liquid mixture formed in said reactor core, means disposed between the vapor separating arrangement and said core for pressure equalization of said mixture, a first stage means for gross separation of said vapor and said liquid, a second stage means for separating entrained liquid within said first stage separated vapor, means for collecting said second stage separated vapor and said first and second stage separated liquid, and means for conducting said second stage separated vapor from inside said reactor to an external vapor utilizing means.

5. In a boiling neutronic reactor including a container therefor, a reactor core supported within said container, a plurality of fuel assemblies containing fissile material and mounted within said reactor core, and means for circulating liquid coolant through said reactor core, the combination comprising a vapor separating arrangement with said container disposed above said core for separating vapor from a vapor-liquid mixture formed in said reactor core, means disposed between the vapor separating arrangement and said core for pressure equalization of said mixture, a first stage means for gross separation of said vapor and said liquid, a second stage means for separating entrained liquid within said first stage separated vapor, a third stage means for separating any remaining entrained fluid within said second stage separated vapor, means for collecting said third stage separated vapor and said separated liquid, and means for conducting said third stage separated vapor from inside said reactor to an external vapor utilizing means.

6. In a boiling neutronic reactor including a container therefor, a reactor core supported within said container, a plurality of fuel assemblies containing fissile material and mounted within said reactor core, and means for circulating liquid coolant through said reactor core, the combination comprising a vapor separating arrangement within said container disposed above said core for separating vapor from a vapor-liquid mixture formed in said reactor core, means disposed between the vapor separating arrangement and said core for pressure equalization of said mixture, a first stage means for gross separation of said vapor and said liquid, a first collecting means for collecting said first stage separated liquid, a second means for separating entrained liquid within said first stage separated vapor, a second collecting means for collecting said second stage separated liquid, and means for conducting said second stage separated vapor from inside said reactor to an external vapor utilizing means.

7. In a boiling neutronic reactor including a container therefore, a reactor core supported within said container, a plurality of fuel assemblies containing fissile material and mounted within said reactor core, and means for circulating liquid coolant through said reactor core, the combination comprising a vapor separating arrangement within said container for separating vapor from a vapor-liquid mixture formed in said reactor core, said arrangement being disposed above said reactor core and comprising means for receiving a vapor-liquid mixture to produce mixing and pressure equalization of said mixture, a first stage means for gross separation of said vapor and said liquid, a first collecting means sealed from said core for collecting said first stage separated liquid, a second stage means for separating entrained liquid within said first stage separated vapor, a third stage means for separating any remaining entrained fluid within said second stage separated vapor, an additional collecting means sealed from said first collecting means and said core for collecting said second stage separated liquid and said third stage separated liquid, and means for conducting said third stage separated vapor from inside said reactor to an external vapor utilizing means.

8. In a boiling neutronic reactor having a reactor core, an upper core plate supporting barrel, and a plurality of control rod guide tubes; a vapor separating arrangement for separating vapor from a vapor-liquid mixture, said arrangement comprising a plenum chamber plate sealably secured within said upper core plate supporting barrel, said plate and the upper surface of said core generally defining a plenum chamber below said plenum chamber plate and within said upper core plate supporting barrel to receive the vapor-liquid mixture from said reactor core to produce mixing and pressure equalization of said vapor-liquid mixture, a plurality of vapor-liquid separators communicating with said plenum chamber and disposed within the height required by said control rod guide tubes, a liquid collection chamber above said plenum chamber plate and within said upper core plate supporting barrel to receive said separated liquid removed from said separators, means for collecting said separated vapor, and means for conducting said separated vapor from inside said reactor to an external vapor utilizing means.

9. In a boiling neutronic reactor having a reactor core, an upper core plate supporting barrel, and a plurality of control rod guide tubes; a vapor separating arrangement for separating vapor from a vapor-liquid mixture, said arrangement comprising a plenum chamber plate sealably secured with said upper core plate supporting barrel, said plate and the upper surface of said core generally defining a plenum chamber below said plenum chamber plate and within said upper core support barrel to receive the vapor-liquid mixture from said reactor core to produce mixing and pressure equalization of said vapor-liquid mixture, a plurality of first stage vapor separating means communicating with said plenum chamber and disposed among said control rod guide tubes and within the height required by said control rod guide tubes, a liquid collection chamber above said plenum chamber plate and within said upper core plate supporting barrel to receive said first stage separated liquid removed from said separators, a second stage vapor separating means which receives the first stage separated vapor and separates the entrained liquid within said first stage separated vapor, a vapor-liquid collection chamber above said liquid collection chamber to receive the second stage separated vapor and said second stage separated liquid, at least one overflow conduit coupling said vapor-liquid collection chamber with said first stage separated liquid contained within said liquid collection chamber so as to maintain a predetermined liquid level within said vapor-liquid collection chamber and a vapor seal; means for removing said upper core plate supporting barrel, said plenum chamber plate, said first stage vapor separating means, said second stage vapor separating means, said control rod guide tubes, and said overflow conduit as a unit to expose the top surface of said reactor core so as to facilitate the fueling and refueling of said reactor core, installation procedures, and maintenance procedures; and means for conducting said second stage vapor from said vapor-liquid collection chamber to an external vapor utilizing means.

10. In a boiling neutronic reactor having an upper core plate supporting barrel and a reactor core, the combination comprising a vapor separating arrangement for separating vapor from a vapor-liquid mixture, said arrangement disposed above said reactor core including a first stage vapor separating means for gross separation of said vapor and said liquid by imparting a centrifugal force to said vapor-liquid mixture whereby said vapor is directed to a central vortex and said liquid is directed to the periphery of said means, a second stage vapor separating means for separating entrained liquid within said first stage separated vapor, a third stage means for separating any remaining entrained liquid within said second stage separated vapor so as to produce a third stage separated vapor, a vapor collection space to collect said third stage separated vapor, a vapor header supported on the periphery of said upper core plate supporting barrel with said core barrel forming part of said vapor header and said vapor header being so shaped so as to permit removal of said vapor header and said upper core plate supporting barrel as a unit, a plurality of vapor downcomer conduits to conduct said third stage separated vapor from said vapor collection space to said vapor header, and means for conducting said third stage separated vapor from said vapor header to external vapor utilizing means.

11. In a boiling neutronic reactor including a vertically elongated pressure vessel having an upper removable reactor vessel head and a lower reactor vessel, a plurality of control rods, a plurality of guide tubes above said reactor core for receiving a plurality of control rod absorber sections respectively, means for circulating a vaporizable coolant within said pressure vessel, a generally tubular core supporting means located within said reactor vessel and spaced therefrom to define an annular space therebetween, a reactor core disposed within and supported by said supporting means, said reactor core being capable of imparting sufficient heat to said liquid coolant for boiling at least a portion thereof resulting in the production of a vapor-liquid mixture, the combination comprising means for forming a plenum chamber within said supporting means and generally above said reactor core so as to receive the vapor-liquid mixture from said core to effect mixing and pressure equalization of said vapor-liquid mixture, means for forming a liquid collection chamber located within said supporting means at a position above said plenum chamber to receive said separated liquid, conduit means for coupling said liquid collection chamber to said liquid coolant circulating means, a vapor-liquid collection chamber disposed above the upper end of said supporting means to receive additional separated liquid which is at a lower pressure than the liquid in said liquid collection chamber, a plurality of vapor-liquid separators disposed among said guide tubes with each of said separators having at least one vapor separating stage, means for removing said separated liquid from said vapor separator and also for providing a vapor seal, an additional vapor separating means located at a position spaced from the lateral periphery of said vapor-liquid collection chamber and supported by said reactor vessel head to remove any remaining entrained fluid within the vapor separated by the vapor-liquid separators, said additional vapor separating means extending downwardly to a position below the liquid level in said vapor-liquid collection chamber to prevent said separated vapor from bypassing said additional separating means, additional conduit means for conducting a flow of excess liquid from said vapor-liquid collection chamber to said liquid collection chamber, an annular vapor header mounted upon the outer surface of said core supporting means to receive said vapor from which substantially all of said liquid has been removed, a plurality of vapor downcomer conduits disposed in the annular space between said core supporting means and said reactor vessel and coupling said vapor-liquid collection chamber with said vapor header, at least one vapor header outlet conduit communicating with said vapor header and extending through said reactor vessel to external vapor utilizing means to provide a flow path of said dry vapor from said vapor header outlet nozzle to said vapor utilizing means; and said vapor-liquid separators, said additional separating means, and all of said chambers being shaped to occupy space normally existing within the upper portion of said pressure vessel and among the absorber sections of said control rods when the latter are in their fully withdrawn positions relative to said reactor core.

12. In a boiling neutronic reactor including a container therefor, a reactor core supported within said container, a plurality of fuel assembles containing fissile material and mounted within said reactor core, a plurality of control rods disposed among said fuel assemblies for controlling the nuclear reaction within said fuel assemblies, a control rod guide tube disposed above said reactor core for each of said control rods, and means for circulating liquid coolant through said reactor core, the combination comprising a plurality of vapor-liquid separators disposed above said reactor core and nested among said guide tubes, means for conducting a vapor-liquid mixture formed in said core to said separators, means for conveying the separated liquid from said separators to said circulating means, means for collecting the separated vapor from said separators, and means for conducting said separated vapor from said collecting means to vapor utilizing means.

13. In a boiling neutronic reactor including a container therefor, a reactor core supported within said container, a plurality of control rods vertically insertable into said core from above, a plurality of fuel assemblies containing fissile material and mounted within said reactor core, and means for circulating liquid coolant through said reactor core, the combination comprising a plurality of vapor-liquid separators disposed above said reactor core and nested among said control rods, each of said separators being disposed directly above its said respective fuel assembly, means for conducting substantially all of a vapor-liquid mixture formed in each fuel assembly to its associated separator, means for conveying the separated liquid from said separators to said circulating means, means for collecting the separated vapor from said separators, and means for conducting said separated vapor from said collecting means to external vapor utilizing means.

14. In a boiling neutronic reactor including a container therefor, a reactor core supported within said container, a plurality of fuel assemblies containing fissile material and mounted within said reactor core, and means for circulating liquid coolant through said reactor core, the combination comprising a plenum chamber means disposed above said reactor core for receiving a vapor-liquid mixture from said reactor core to produce mixing and pressure equalization of said mixture, a plurality of vapor-liquid separators within said container disposed above and coupled to said plenum chamber, means for conveying the separated liquid from said separators to said circulating means, means for collecting the separated vapor from said separators, and means for conducting said separated vapor from said collecting means to vapor utilizing means.

15. In a boiling neutronic reactor including a container therefore, a reactor core supported within said container, a plurality of fuel assemblies containing fissile material and mounted within said reactor core, a plurality of control rods disposed among said fuel assemblies for controlling the nuclear reaction within said fuel assemblies, a control rod guide tube disposed above said fuel assemblies for each of said rods whereby said rods are guided upon withdrawal from said fuel assemblies by said guide tubes, and means for circulating coolant liquid through said reactor core, the combination comprising a plurality of vapor-liquid separators disposed above said reactor core and nested among said guide tubes, means for conducting a vapor-liquid mixture formed in said core to said separators; each of said separators including a vertical tube, a swirling means mounted within said vertical tube for imparting a centrifugal force to said vapor-liquid mixture whereby said vapor is formed into a central vortex and the liquid is directed to the inner periphery of said vertical tube, at least one downcomer conduit coupled to the outer periphery of said vertical tube at a location above said swirling means and extending downwardly between said guide tubes whereby the separated liquid is collected and conducted away from said separators; means for collecting said separated liquid from said downcomer conduit and for conveying said separated liquid to said circulating means, means for collecting the separated vapor from said separators, and means for conducting said separated vapor from said collecting means to vapor utilizing means.

16. In a boiling neutronic reactor having a plurality of fuel assemblies, a plurality of control rods disposed among said fuel assemblies for controlling the nuclear reaction within said fuel assemblies, a control rod guide tube disposed above said fuel assemblies for each of said rods whereby said rods are guided upon withdrawal from said fuel assemblies by said guide tubes, circulating means for forcing a liquid coolant upwardly through said fuel assemblies to produce a vapor-liquid mixture, the combination comprising means for forming a plenum chamber disposed above said assemblies to receive said vapor-liquid mixture and to produce mixing and pressure equalization of said mixture, a plurality of vapor-liquid separators disposed above said plenum chamber and nested among said guide tubes, each of said separators communicating with said plenum chamber to receive a portion of said vapor-liquid mixture therefrom, means for conducting the separated vapor from said separators to external vapor utilizing equipment, and means for conducting the separator liquid from said separators to said circulating means.

17. In a boiling neutronic reactor, a plurality of fuel assemblies, a plurality of control rods disposed among said fuel assemblies for controlling the nuclear reaction within said fuel assemblies, each of said control rods having an absorber section, a control rod guide tube disposed above said fuel assemblies for each of said rods whereby said rods are guided upon withdrawal from said fuel assemblies by said guide tubes, circulating means for forcing a liquid coolant upwardly through said fuel assemblies to produce a vapor-liquid mixture; means forming a plenum chamber disposed above said assemblies to receive said vapor-liquid mixture and to produce mixing and pressure equalization of said mixture, a plurality of vapor-liquid separators disposed above said plenum chamber within the height determined by said control rod absorber sections when withdrawn above said fuel assemblies and nested among said guide tubes within the lateral space determined by said fuel assemblies.

18. In a boiling neutronic reactor, a plurality of fuel assemblies, a plurality of control rods disposed among said fuel assemblies for controlling the nuclear reaction within said fuel assemblies, a control rod guide tube disposed above said fuel assemblies for each of said rods whereby said rods are guided upon withdrawal from said fuel assemblies by said guide tubes, circulating means for forcing a liquid coolant upwardly through said fuel assemblies to produce a vapor-liquid mixture; means forming a plenum chamber disposed above said assemblies to receive said vapor-liquid mixture and to produce mixing and pressure equalization of said mixture, a plurality of vapor-liquid separators disposed above said plenum chamber and nested among said guide tubes, and each of said separators comprising vapor separating means for imparting a centrifugal force to said vapor-liquid mixture entering said separator from said plenum chamber whereby the vapor is directed to a central vortex and the liquid is directed to the periphery of said separator; and said plenum chamber means, said control rod guide tubes, and said vapor-liquid separators being rigidly joined to permit installation and removal thereof as a unit.

References Cited by the Examiner

UNITED STATES PATENTS

| | | | |
|---|---|---|---|
| 2,059,521 | 11/1936 | Hawley | 55—345 |
| 2,594,490 | 4/1952 | Patterson | 55—347 |
| 2,862,479 | 12/1958 | Blaser et al. | 204—193.2 X |
| 2,917,444 | 12/1959 | Dreffin | 204—193.2 |
| 2,938,845 | 5/1960 | Treshow | 204—193.2 |
| 2,949,414 | 8/1960 | Ransohoff et al. | 176—56 |
| 2,987,458 | 6/1961 | Breden et al. | 204—193.2 |
| 3,010,537 | 11/1961 | Baker et al. | 55—323 |
| 3,034,975 | 5/1962 | Beurtheret | 204—193.2 |
| 3,041,264 | 6/1962 | Ricard | 176—54 |
| 3,070,537 | 12/1962 | Treshow | 204—193.2 |
| 3,085,959 | 4/1963 | Germer | 204—193.2 |

FOREIGN PATENTS 215,410  6/1958  Australia.

BENJAMIN R. PADGETT, *Acting Primary Examiner.*

REUBEN EPSTEIN, CARL D. QUARFORTH,
*Examiners.*

W. T. HOUGH, L. D. RUTLEDGE,
*Assistant Examiners.*